(12) United States Patent
Ren et al.

(10) Patent No.: US 11,991,092 B2
(45) Date of Patent: May 21, 2024

(54) CLOUD DATA CENTER TENANT-LEVEL OUTBOUND RATE LIMITING METHOD AND SYSTEM

(71) Applicant: Tsinghua University, Beijing (CN)

(72) Inventors: Fengyuan Ren, Beijing (CN); Yingchen Fan, Beijing (CN); Kun Qian, Beijing (CN); Qingkai Meng, Beijing (CN); Yiran Zhang, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 10 days.

(21) Appl. No.: 17/855,826

(22) Filed: Jul. 1, 2022

(65) Prior Publication Data
US 2023/0006943 A1   Jan. 5, 2023

(30) Foreign Application Priority Data
Jul. 1, 2021 (CN) .......................... 202110746087.7

(51) Int. Cl.
*H04L 47/80* (2022.01)
*H04L 47/62* (2022.01)
*H04L 47/762* (2022.01)
*H04L 47/78* (2022.01)

(52) U.S. Cl.
CPC ........ *H04L 47/808* (2013.01); *H04L 47/6215* (2013.01); *H04L 47/762* (2013.01); *H04L 47/781* (2013.01); *H04L 47/801* (2013.01)

(58) Field of Classification Search
None
See application file for complete search history.

(56) References Cited

U.S. PATENT DOCUMENTS

| 2004/0042484 | A1* | 3/2004 | Widmer | H04L 47/808 370/465 |
| 2007/0260728 | A1* | 11/2007 | Noble | H04L 41/142 709/224 |
| 2015/0124612 | A1* | 5/2015 | Schlansker | H04L 47/2433 370/235 |
| 2018/0007455 | A1* | 1/2018 | Mehrvar | H04L 49/25 |

* cited by examiner

*Primary Examiner* — Jonathan A Bui
(74) *Attorney, Agent, or Firm* — PORUS IP LLC

(57) ABSTRACT

A cloud data center tenant-level outbound rate limiting method includes: starting a timer, receiving and generating statistics of outbound packets of tenants in a current period, obtaining local traffic rate information of the tenants based on all the outbound packets of the tenants in the current period, and generating local bandwidth demand frames of the tenants based on the local traffic rate information of the tenants; when a timing of the timer reaches the end of the current period, sending the local bandwidth demand frames of the tenants to a switch; receiving a global bandwidth demand frame sent by the switch, and computing bandwidth budgets of the tenants based on the local traffic rate information of the tenants and the global bandwidth demand frames of the tenants; modifying rate limiting parameters, and limiting the rate of the outbound packets of the tenants in a next period.

12 Claims, 5 Drawing Sheets

CLOUD DATA CENTER TENANT-LEVEL OUTBOUND RATE LIMITING METHOD AND SYSTEM

CROSS REFERENCE TO THE RELATED APPLICATION

This application is based upon and claims priority to Chinese Patent Application No. 202110746087.7 filed on Jul. 1, 2021, the entire contents of which are incorporated herein by reference.

TECHNICAL FIELD

The present application relates to the field of computer technology, in particular to a cloud data center tenant-level outbound rate limiting method and system.

BACKGROUND

A cloud service provider provides shared bandwidth service for the outbound traffic of a cloud data center, tenants purchase a set of virtual machines that multiplex a shared bandwidth, and the cloud service provider ensures that a sum of all the outbound traffic of the virtual machines of the tenants does not exceed the bandwidth ordered by the tenants by real-time rate limiting on the virtual machines of the tenants, thereby achieving tenant-level rate limiting. At present, the tenant-level rate limiting is achieved in the case that the outbound packets of the tenants are distributed to a plurality of gateway servers of a cloud gateway, and the difficulty is the aggregate rate limiting of the plurality of gateway servers.

A centralized controller is used in related technologies to dynamically collect tenants' traffic bandwidth demands and allocate bandwidth budgets to all gateway servers based on tenants' traffic bandwidth demands, and the gateway servers limit the tenants' traffic rate according to the bandwidth budget.

The scalability is poor where a larger number of tenants appear in the cloud data center in related technologies, liable to cause a bottleneck in computing bandwidth budget and communication, great overheads of computing resources and bandwidth resources, increased delay in allocating the bandwidth budget, and decreased rate limiting accuracy.

SUMMARY

The present invention provides a cloud data center tenant-level outbound rate limiting method and a system thereof, in order to solve the technical problem that the scalability is poor where a larger number of tenants appear in the cloud data center in related technologies, liable to cause a bottleneck in computing bandwidth budget and communication, great overheads of computing resources and bandwidth resources, increased delay in allocating the bandwidth budget, and decreased rate limiting accuracy.

In the first aspect, the present invention provides a cloud data center tenant-level outbound rate limiting method applied to a gateway server, including the following steps:

starting a timer, receiving and making statistics of outbound packets of tenants in a current period, obtaining local traffic rate information of the tenants based on all the outbound packets of the tenants in the current period, and generating local bandwidth demand frames of the tenants based on the local traffic rate information of the tenants;

when the timing of the timer reaches the current period, sending the local bandwidth demand frames of the tenants to a switch;

receiving global bandwidth demand frames of the tenants sent by the switch, and computing bandwidth budgets of the tenants based on the local traffic rate information of the tenants and the global bandwidth demand frames of the tenants; and modifying rate limiting parameters based on the bandwidth budgets of the tenants, and limiting the rate of the outbound packets of the tenants in a next period based on the rate limiting parameters.

Optionally, the step of computing bandwidth budgets of the tenants based on the local traffic rate information of the tenants and the global bandwidth demand frames of the tenants specifically includes the following steps:

obtaining global traffic rate information of the tenants based on the global bandwidth demand frames of the tenants; and computing bandwidth budgets of the tenants based on the local traffic rate information of the tenants and the global traffic rate information of the tenants.

Optionally, the step of computing bandwidth budgets of the tenants based on the local traffic rate information of the tenants and the global traffic rate information of the tenants specifically includes the following steps:

computing bandwidth budgets allocated to the tenants by formula (1) based on the local traffic rate information of the tenants and the global bandwidth demand frames of the tenants:

$$R = \frac{D_{local}}{D_{global}} * R_0 \tag{1}$$

where R represents bandwidth budgets of the tenants, $R_0$ represents bandwidths ordered by the tenants, $D_{local}$ represents local traffic rate information of the tenants, and $D_{global}$ represents global traffic rate information of the tenants.

In the second aspect, the present invention provides a cloud data center tenant-level outbound rate limiting method applied to a switch, including the following steps:

receiving local bandwidth demand frames of the tenants sent by all gateway servers, and aggregating the local bandwidth demand frames of the tenants sent by all the gateway servers to obtain global bandwidth demand frames of the tenants; and broadcasting the global bandwidth demand frames of the tenants to all the gateway servers.

Optionally, the step of aggregating the local bandwidth demand frames of the tenants sent by all gateway servers to obtain the global bandwidth demand frames of the tenants specifically includes the following steps:

acquiring all local traffic rate information of the tenants based on the local bandwidth demand frames of the tenants sent by all the gateway servers, and summing up all the local traffic rate information of the tenants; and modifying local traffic rate information fields in the last received local bandwidth demand frames of the tenants based on the summation result to obtain the global bandwidth demand frames of the tenants.

Optionally, the switch includes a first switch and a second switch, and the first switch includes at least one switch.

The step of receiving local bandwidth demand frames of the tenants sent by all gateway servers, and aggregating the local bandwidth demand frames of the tenants sent by all the gateway servers to obtain the global bandwidth demand frames of the tenants specifically includes the following steps:

the first switch receives the local bandwidth demand frames of the tenants sent by at least one gateway server, aggregates the local bandwidth demand frames of the tenants to obtain first local bandwidth demand frames of the tenants, and sends the first local bandwidth demand frames of the tenants to the second switch; and the second switch receives the first local bandwidth demand frames of the tenants sent by the first switch, and aggregates the first local bandwidth demand frames of the tenants to obtain the global bandwidth demand frames of the tenants.

The step of broadcasting the global bandwidth demand frames of the tenants to all the gateway servers specifically includes the following steps:

the global bandwidth demand frames of the tenants are broadcast to the first switch; and the first switch receives and broadcasts the global bandwidth demand frames of the tenants to at least one gateway server.

Optionally, the second switch includes at least one switch, wherein any second switch serves as a root node, the first switch serves as a layer-n child node, and child nodes at other layers are at least one second switch.

The step that the first switch sends the first local bandwidth demand frames of the tenants to the second switch, and the second switch receives the first local bandwidth demand frames of the tenants sent by the first switch and aggregates the first local bandwidth demand frames of the tenants to obtain the global bandwidth demand frames of the tenants specifically includes the following steps:

the first switch sends the first local bandwidth demand frames of the tenants corresponding to each first switch to at least one second switch at a layer-(n−1) child node;

at least one second switch at the layer-(n−1) child node aggregates the first local bandwidth demand frames of the tenants to obtain second local bandwidth demand frames of the tenants corresponding to each second switch at the layer-(n−1) child node, and sends the second local bandwidth demand frames of the tenants to at least one second switch at a layer-(n−2) child node until the second switch at the root node receives the $(n-1)^{th}$ local bandwidth demand frames of the tenants corresponding to each second switch at the layer-2 child node; and the second switch at the root node aggregates the $(n-1)^{th}$ local bandwidth demand frames of the tenants to obtain the global bandwidth demand frames of the tenants.

The step that the second switch broadcasts the global bandwidth demand frames of the tenants to the first switch specifically includes the following steps:

the second switch at the root node broadcasts the global bandwidth demand frames of the tenants to at least one second switch at the layer-2 child node, and at least one second switch at the layer-2 child node broadcasts the global bandwidth demand frames of the tenants to at least one second switch at the layer-3 child node until at least one second switch at the layer-(n−1) child node receives the global bandwidth demand frames of the tenants and broadcasts the global bandwidth demand frames of the tenants to the first switch.

Optionally, the switch includes at least two switches.

The step of receiving local bandwidth demand frames of the tenants sent by all gateway servers, and aggregating the local bandwidth demand frames of the tenants sent by all the gateway servers to obtain the global bandwidth demand frames of the tenants specifically includes the following steps:

a $i^{th}$ switch receives the local bandwidth demand frames of the tenants sent by at least one gateway server corresponding to the $i^{th}$ switch, and receives the $(i-1)^{th}$ local bandwidth demand frames of the tenants sent by the $(i-1)^{th}$ switch;

the local bandwidth demand frames of the tenants and $(i-1)^{th}$ local bandwidth demand frames of the tenants are aggregated to obtain the $i^{th}$ local bandwidth demand frames of the tenants;

if the $i^{th}$ local bandwidth demand frames of the tenants are the global bandwidth demand frames of the tenants, the global bandwidth demand frames of the tenants are sent to the first switch, and the first switch sends the global bandwidth demand frames of the tenants to the second switch until the global bandwidth demand frames of the tenants are received by all switches;

wherein i≥2 and i is an integer.

The step of broadcasting the global bandwidth demand frames of the tenants to all the gateway servers specifically includes the following step:

each switch broadcasts the global bandwidth demand frames of the tenants to at least one gateway server corresponding to each switch.

In the third aspect, the present invention provides a gateway server, including:

a demand collector, configured to start a timer, receive and make statistics of outbound packets of tenants in a current period, obtain local traffic rate information of the tenants based on all the outbound packets of the tenants in the current period, and generate local bandwidth demand frames of the tenants based on the local traffic rate information of the tenants; and configured to send the local bandwidth demand frames of the tenants to a switch when the timing of the timer reaches the current period;

a budget allocator, configured to receive global bandwidth demand frames of the tenants sent by the switch, and compute bandwidth budgets of the tenants based on the local traffic rate information of the tenants and the global bandwidth demand frames of the tenants; and a rate regulator, configured to modify rate limiting parameters based on the bandwidth budgets of the tenants, and limit the rate of the outbound packets of the tenants in a next period based on the rate limiting parameters.

In the fourth aspect, the present invention provides a switch, including:

an aggregator, configured to receive local bandwidth demand frames of the tenants sent by all gateway servers, and aggregate the local bandwidth demand frames of the tenants sent by all the gateway servers to obtain global bandwidth demand frames of the tenants; and a broadcasting unit, configured to broadcast the global bandwidth demand frames of the tenants to all the gateway servers.

In the fifth aspect, the present invention provides a cloud data center tenant-level outbound rate limiting system applied to a gateway server, including the gateway server described in the third aspect and the switch described in the fourth aspect.

In the sixth aspect, the present invention also provides an electronic device, including a memory, a processor, and a computer program stored in the memory and operable on the processor, wherein the processor executes the program to realize the steps of the cloud data center tenant-level outbound rate limiting method described in the first aspect or the second aspect.

In the seventh aspect, the present invention also provides a non-transitory computer-readable storage medium, with a computer program stored, wherein the program is executed by the processor to realize the steps of the cloud data center tenant-level outbound rate limiting method described in the first aspect or the second aspect.

In the cloud data center tenant-level outbound rate limiting method and system provided by the present invention, the gateway server starts a timer, receives and makes statistics of outbound packets of tenants in a current period, obtains the local traffic rate information of the tenants based on all the outbound packets of the tenants in the current period, generates local bandwidth demand frames of the tenants based on the local traffic rate information of the tenants, sends the local bandwidth demand frames of the tenants to a switch when the timing of the timer reaches the current period, receives global bandwidth demand frames of the tenants sent by the switch, computes bandwidth budgets of the tenants based on the local traffic rate information of the tenants and the global bandwidth demand frames of the tenants, modifies rate limiting parameters based on the bandwidth budgets of the tenants, and limits the rate of the outbound packets of the tenants in a next period based on the rate limiting parameters, so that the overheads of computing resources and bandwidth resources can be effectively reduced, the rate limiting accuracy can be improved, and the scalability can be improved.

BRIEF DESCRIPTION OF THE DRAWINGS

In order to explain the technical solutions of the present invention or in the prior art more clearly, the accompanying drawings to be used in describing the embodiments or the prior art will be briefly introduced below. It is obvious that the accompanying drawings below only show some embodiments of the present invention. For those of ordinary skill in the art, other related drawings can also be obtained based on these drawings without making creative efforts.

DETAILED DESCRIPTION OF THE EMBODIMENTS

In order to make the objectives, technical solutions and advantages of the present invention more clearly, the technical solutions in the present invention will be described clearly and completely below in combination with the accompanying drawings in the present invention. It is obvious that the embodiments described are only parts of, rather than all of, the embodiments of the present invention. On the basis of the embodiments of the present invention, all the other embodiments obtained by those of ordinary skill in the art without making creative efforts will fall within the protection scope of the present invention.

The terms "first", "second", etc. in the specification and claims of the present invention are only used to distinguish similar objects, rather than describing specific order or sequence. It should be understood that the data used in this way are interchangeable in appropriate cases, so that the embodiments of the present invention can be practiced in sequences other than those illustrated or described herein, besides, the objects distinguished by "first", "second", etc. are usually of one type, and the number of objects is not limited, for example, the first object may be one or multiple. Moreover, in the description and the claims, "and/or" represents at least one of the connected objects, and the character "/" generally indicates that the related objects are in an "or" relationship.

It should be understood that "one embodiment" or "an embodiment" mentioned in the specification means that the specific features, structures or characteristics related to an embodiment are involved in at least one embodiments of the present invention. Therefore, "in one embodiment" or "in an embodiment" described throughout the specification do not necessarily refer to the same embodiment. In addition, these specific features, structures or characteristics can be combined in any suitable manner in one or multiple embodiments.

In the embodiments of the present invention, the term "plurality" refers to two or more than two, other quantifiers and similar words.

The cloud data center tenant-level outbound rate limiting method provided by an embodiment of the present invention will be explained in detail below through some embodiments and the application scenes thereof in combination with the accompanying drawings.

Figure 1:
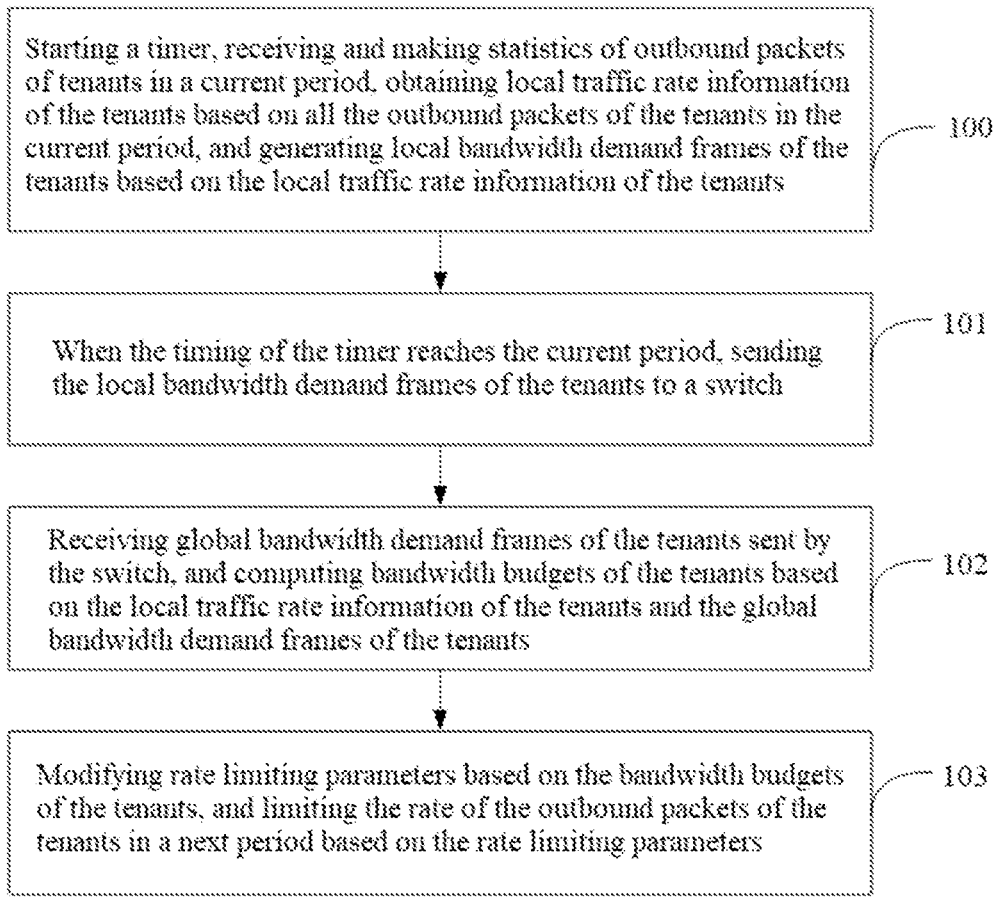
FIG. 1 is a first flow chart of a cloud data center tenant-level outbound rate limiting method provided by the present invention.

In order to solve the problem that the scalability is poor where a larger number of tenants appear in the cloud data center in related technologies, liable to cause a bottleneck in computing bandwidth budget and communication, great overheads of computing resources and bandwidth resources, increased delay in allocating the bandwidth budget, and decreased rate limiting accuracy, embodiments of the present invention provides a cloud data center tenant-level outbound rate limiting method, and FIG. 1 is a first flow chart of a cloud data center tenant-level outbound rate limiting method provided by an embodiment of the present invention. As shown in FIG. 1, the executor can be a gateway server, and the method includes the following steps:

S100: a timer is started, outbound packets of tenants in a current period are received and statistics are made, local traffic rate information of the tenants is obtained based on all the outbound packets of the tenants in the current period, and local bandwidth demand frames of the tenants are generated based on the local traffic rate information of the tenants.

It needs to be indicated that in order to solve the problem in the related art that all bandwidth budgets are computed using a centralized controller, and it results in great overheads of computing resources, an embodiment of the present invention adopts a distributed rate limiting scheme, and specifically provides a cloud data center tenant-level outbound rate limiting method. The method is applied to a plurality of gateway servers to realize that each gateway server computes the bandwidth budget based on the outbound packets of tenants received on the gateway server, so as to effectively reduce the overheads of computing resources.

Local traffic rate information of the tenants is a ratio of a sum of sizes of all the outbound packets of tenants in a current period to a period.

Local bandwidth demand frames of the tenants carry the local traffic rate information of the tenants.

In an embodiment, each gateway server starts the timer, an egress router of a cloud data center sends the outbound packets of tenants to each gateway server, then each gateway server receives and makes statistics of the outbound packets of the tenants in a current period, computes the local traffic rate information of the tenants based on all the outbound packets of the tenants in the current period, and generate local bandwidth demand frames of the tenants based on the local traffic rate information of the tenants.

S101: when the timing of the timer reaches the current period, the local bandwidth demand frames of the tenants are sent to a switch.

In an embodiment, when the timing of the timer reaches the current period, each gateway server sends the local bandwidth demand frames of the tenants to a switch.

S102: global bandwidth demand frames of the tenants sent by the switch are received, and bandwidth budgets of the tenants are computed based on the local traffic rate information of the tenants and the global bandwidth demand frames of the tenants.

The global bandwidth demand frames of the tenants are obtained by the switch which aggregates the received local bandwidth demand frames of the tenants sent by all the gateway servers.

The bandwidth budgets of the tenants refer to the bandwidth capacity of the tenants allocated to each gateway server, used to limit the rate of the outbound packets of the tenants reaching the gateway server.

In an embodiment, each gateway server receives the global bandwidth demand frames of the tenants sent by the switch, and computes the bandwidth budgets of the tenants based on the local traffic rate information of the tenants and the global bandwidth demand frames of the tenants.

S103: rate limiting parameters are modified based on the bandwidth budgets of the tenants, and the rate of the outbound packets of the tenants in a next period is limited based on the rate limiting parameters.

The rate limiting parameters refers to related parameters of rate limiting algorithm corresponding to the rate limiting operation executed by the gateway server.

Optionally, if the rate limiting algorithm is the token bucket algorithm, the step of modifying rate limiting parameters includes updating a number of tokens in a token bucket, a speed of adding tokens, and a depth of the token bucket.

In an embodiment, the gateway server modifies the rate limiting parameters based on the bandwidth budgets of the tenants, and limits the rate of the outbound packets of the tenants in a next period based on the rate limiting parameters.

Further, each gateway server executes the token bucket algorithm, and when the outbound packets of the tenants in the next period reach the gateway server, the gateway server determines whether the traffic rate can be forwarded based on the rate limiting parameters of the token bucket algorithm, for example, if the number of tokens in the token bucket parameter meets a preset threshold, the outbound packets of the tenants can be forwarded by the gateway server to the switch, then the switch sends the outbound packets of the tenants to the egress router of the cloud data center, and the egress router of the cloud data center sends the outbound packets of the tenants to the Internet; and on the contrary, the gateway server discards the outbound packets of the tenants.

In the cloud data center tenant-level outbound rate limiting method and system provided by the present invention, the gateway server starts a timer, receives and makes statistics of outbound packets of the tenants in a current period, obtains local traffic rate information of the tenants based on all the outbound packets of the tenants in the current period, generates local bandwidth demand frames of the tenants based on the local traffic rate information of the tenants, sends the local bandwidth demand frames of the tenants to a switch when the timer reaches the current period, receives global bandwidth demand frames of the tenants sent by the switch, computes bandwidth budgets of the tenants based on the local traffic rate information of the tenants and the global bandwidth demand frames of the tenants, modifies rate limiting parameters based on the bandwidth budgets of the tenants, and limits the rate of the outbound packets of the tenants in a next period based on the rate limiting parameters, so that the overheads of computing resources and bandwidth resources can be effectively reduced, and the rate limiting accuracy can be improved.

On the basis of the contents of the above-mentioned embodiment, the step of computing bandwidth budgets of the tenants based on the local traffic rate information of the tenants and the global bandwidth demand frames of the tenants specifically includes the following steps:

obtaining global traffic rate information of the tenants based on the global bandwidth demand frames of the tenants; and computing bandwidth budgets of the tenants based on the local traffic rate information of the tenants and the global traffic rate information of the tenants.

The global bandwidth demand frames of the tenants are obtained by the switch which aggregates all the received local bandwidth demand frames of the tenants.

The global traffic rate information of the tenants is a sum of all local traffic rate information of the tenants.

The global bandwidth demand frames of the tenants carry the global traffic rate information of the tenants.

Optionally, the step of computing bandwidth budgets of the tenants based on the local traffic rate information of the tenants and the global traffic rate information of the tenants specifically includes the following step:

computing bandwidth budgets allocated to the tenants by formula (1) based on the local traffic rate information of the tenants and the global bandwidth demand frames of the tenants:

$$R = \frac{D_{local}}{D_{global}} * R_0 \qquad (1)$$

where R represents bandwidth budgets of the tenants, $R_0$ represents bandwidths ordered by the tenants, $D_{local}$ represents local traffic rate information of the tenants, and $D_{global}$ represents global traffic rate information of the tenants.

In an embodiment, each gateway server acquires the global traffic rate information of the tenants based on the global bandwidth demand frames of the tenants, and computes the bandwidth budgets of the tenants on the gateway server by formula (1) based on the local traffic rate information of the tenants and the global traffic rate information of the tenants.

In the cloud data center tenant-level outbound rate limiting method provided by the embodiment of present invention, the gateway server acquires the global traffic rate information of the tenants based on the global bandwidth demand frames of the tenants, and computes the bandwidth budgets of the tenants on the gateway server based on the local traffic rate information of the tenants and the global traffic rate information of the tenants, so that the overheads of computing resources and bandwidth resources can be effectively reduced, and the rate limiting accuracy can be improved.

Figure 2:
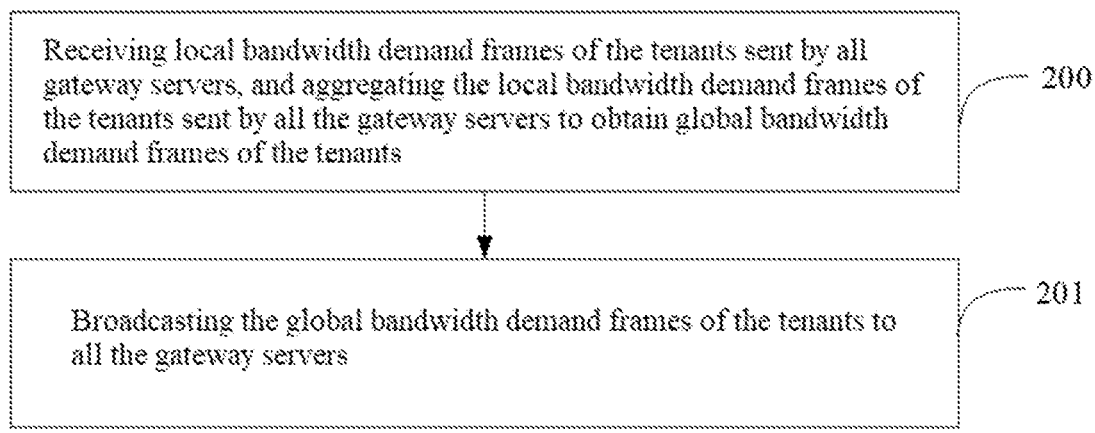
FIG. 2 is a second flow chart of a cloud data center tenant-level outbound rate limiting method provided by the present invention.

FIG. 2 is a second flow chart of a cloud data center tenant-level outbound rate limiting method provided by an embodiment of the present invention. As shown in FIG. 2, the executor can be a switch, and the method includes the following steps:

S200: local bandwidth demand frames of the tenants sent by all gateway servers are received, and the local bandwidth demand frames of the tenants sent by all the gateway servers are aggregated to obtain global bandwidth demand frames of the tenants.

It needs to be indicated that a switch can be connected with a plurality of gateway servers according to the number of its ports. For example, when a switch has 32 ports, the switch can be connected with at most 32 gateway servers.

In an embodiment, the switch receives the local bandwidth demand frames of the tenants sent by all gateway servers, and aggregates all the local bandwidth demand frames of the tenants to obtain global bandwidth demand frames of the tenants.

S201: the global bandwidth demand frames of the tenants are broadcast to all the gateway servers.

In an embodiment, the switch broadcasts the global bandwidth demand frames of the tenants to all the gateway servers, and each gateway server computes bandwidth budgets of the tenants on the gateway server based on the global bandwidth demand frames of the tenants.

In the cloud data center tenant-level outbound rate limiting method provided by the embodiment of present invention, the switch receives local bandwidth demand frames of the tenants sent by all gateway servers, aggregates the local bandwidth demand frames of the tenants sent by all the gateway servers to obtain global bandwidth demand frames of the tenants, and broadcasts the global bandwidth demand frames of the tenants to all the gateway servers, so that the overheads of computing resources and bandwidth resources can be effectively reduced, and the rate limiting accuracy can be improved.

On the basis of the contents of the above-mentioned embodiment, the step of aggregating the local bandwidth demand frames of the tenants sent by all the gateway servers to obtain global bandwidth demand frames of the tenants specifically includes the following steps:

acquiring all local traffic rate information of the tenants based on the local bandwidth demand frames of the tenants sent by all the gateway servers, and summing up all the local traffic rate information of the tenants; and modifying a local traffic rate information field in the received local bandwidth demand frames of the tenants sent by the last gateway server based on the summation result to obtain the global bandwidth demand frames of the tenants.

The summation result is the global traffic rate information of the tenants.

It needs to be indicated that the global traffic rate information of the tenants is a sum of all local traffic rate information of the tenants.

It needs to be indicated that on acquiring all local traffic rate information of the tenants, the switch only reserves the local bandwidth demand frames of the tenants sent by the last gateway server, modifies the local traffic rate information field in the local bandwidth demand frames of the tenants to obtain the global bandwidth demand frames of the tenants, and discards other local bandwidth demand frames of the tenants.

In an embodiment, the switch acquires all local traffic rate information of the tenants based on the local bandwidth demand frames of the tenants sent by all the gateway servers, sums up all the local traffic rate information of the tenants to obtain global traffic rate information of the tenants, obtains global bandwidth demand frames of the tenants by modifying the attribute value of the local traffic rate information field in the local bandwidth demand frames of the tenants into global traffic rate information of the tenants, and discards other local bandwidth demand frames of the tenants.

In the cloud data center tenant-level outbound rate limiting method provided by the embodiment of present invention, the switch acquires all local traffic rate information of the tenants based on the local bandwidth demand frames of the tenants sent by all the gateway servers, sums up all the local traffic rate information of the tenants, modifies the local traffic rate information field in the received local bandwidth demand frames of the tenants sent by the last gateway server based on the summation result, and then computes bandwidth demand frames on each gateway server based on the global bandwidth demand frames of the tenants, so that the overheads of computing resources and bandwidth resources can be effectively reduced, and the rate limiting accuracy can be improved.

On the basis of the contents of the above-mentioned embodiment, the switch includes a first switch and a second switch, and the first switch includes at least one switch.

The step of receiving local bandwidth demand frames of the tenants sent by all gateway servers, and aggregating the local bandwidth demand frames of the tenants sent by all the gateway servers to obtain the global bandwidth demand frames of the tenants specifically includes the following steps:

the first switch receives the local bandwidth demand frames of the tenants sent by at least one gateway server, aggregates the local bandwidth demand frames of the tenants to obtain first local bandwidth demand frames of the tenants, and sends the first local bandwidth demand frames of the tenants to the second switch; and the second switch receives the first local bandwidth demand frames of the tenants sent by the first switch, and aggregates the first local bandwidth demand frames of the tenants to obtain the global bandwidth demand frames of the tenants.

The step of broadcasting the global bandwidth demand frames of the tenants to all the gateway servers specifically includes the following steps:

the global bandwidth demand frames of the tenants are broadcast to the first switch; and the first switch receives and broadcasts the global bandwidth demand frames of the tenants to at least one gateway server.

It needs to be indicated that considering the large scale of the cloud data center, the number of gateway servers that can be connected to a switch is too limited to handle the outbound packets of large-scale tenants. Therefore, the switch needs to be scaled. In the embodiment of the present invention, the scaling function of the switch is realized by a star topology.

Wherein the star topology is that the second switch is connected with a plurality of first switches, and each first switch can be connected with at least one gateway server.

The first switch is configured to receive the local bandwidth demand frames of the tenants sent by at least one gateway server, aggregate the local bandwidth demand frames of the tenants to obtain the first local bandwidth demand frames of the tenants, and send the first local bandwidth demand frames of the tenants to the second switch.

The second switch is configured to aggregate the first local bandwidth demand frames of the tenants sent by all the first switches to obtain the global bandwidth demand frames of the tenants, and broadcast the global bandwidth demand frames of the tenants to each first switch.

The first bandwidth demand frames of the tenants are obtained by each first switch which aggregates the received local bandwidth demand frames of the tenants sent by all gateway servers corresponding to the first switch.

In an embodiment, each first switch receives the local bandwidth demand frames of the tenants sent by at least one gateway server corresponding to the first switch, aggregates at least one local bandwidth demand frames of the tenants to obtain first local bandwidth demand frames of the tenants, and sends the first local bandwidth demand frames of the tenants to the second switch.

Further, the second switch receives the first local bandwidth demand frames of the tenants sent by all the first switches, and aggregates all the first local bandwidth demand frames of the tenants to obtain the global bandwidth demand frames of the tenants.

Further, the second switch broadcasts the global bandwidth demand frames of the tenants to all the first switches, and each first switch receives the global bandwidth demand frames of the tenants and broadcasts the global bandwidth demand frames of the tenants to at least one gateway server corresponding to the first switch.

In the cloud data center tenant-level outbound rate limiting method provided by the embodiment of present invention, each first switch receives the local bandwidth demand frames of the tenants sent by at least one gateway server corresponding to the first switch, aggregates the local bandwidth demand frames of the tenants to obtain first local bandwidth demand frames of the tenants, and sends the first local bandwidth demand frames of the tenants to the second switch; the second switch receives the first local bandwidth demand frames of the tenants sent by all the first switches, aggregates the first local bandwidth demand frames of the tenants to obtain the global bandwidth demand frames of the tenants, and broadcasts the global bandwidth demand frames of the tenants to the first switch; and the first switch receives and broadcasts the global bandwidth demand frames of the tenants to at least one gateway server, and then computes the bandwidth budgets of the tenants on each gateway server based on the global bandwidth demand frames of the tenants, so that the overheads of computing resources and bandwidth resources can be effectively reduced, the rate limiting accuracy can be improved, and the scalability is good.

Figure 3:
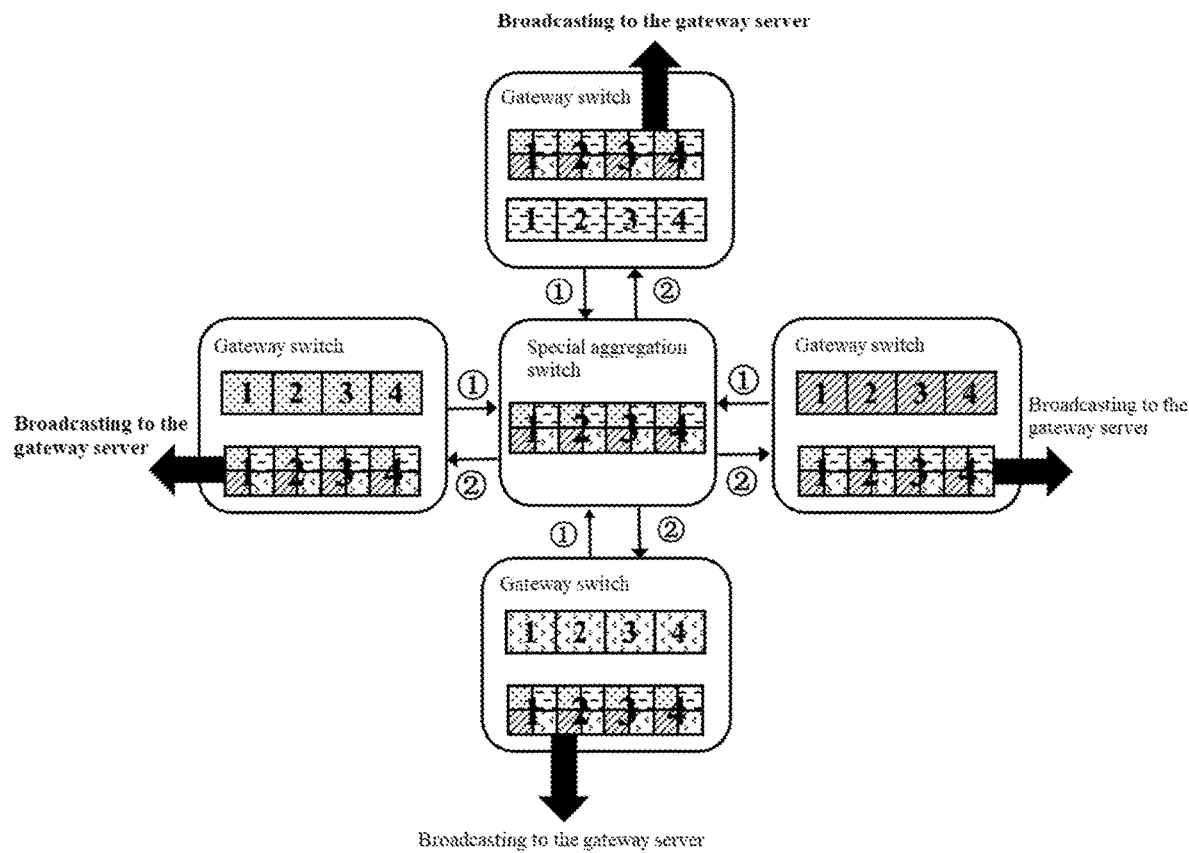
FIG. 3 is a first scene diagram of a cloud data center tenant-level outbound rate limiting method provided by the present invention.

The process of realizing the cloud data center tenant-level outbound rate limiting method based on a scalable star topology is specifically explained in combination with FIG. 3. FIG. 3 is a first scene diagram of a cloud data center tenant-level outbound rate limiting method provided by an embodiment of the present invention.

As shown in FIG. 3, the star topology is mainly composed of a special aggregation switch and a plurality of gateway switches, wherein the special aggregation switch is connected with the multiple gateway switches.

S1: each gateway switch aggregates the local bandwidth demand frames of the tenants sent by at least one gateway server corresponding to the gateway switch to obtain first local bandwidth demand frames of the tenants, and sends the first local bandwidth demand frames of the tenants to the special aggregation switch.

S2: the special aggregation switch aggregates all the first local bandwidth demand frames of the tenants to obtain the global bandwidth demand frames of the tenants, and broadcasts the global bandwidth demand frames of the tenants to all the gateway switches; and each gateway switch sends the global bandwidth demand frames of the tenants to at least one gateway server corresponding to the gateway switch.

On the basis of the contents of the above-mentioned embodiment, the second switch includes at least one switch, wherein any second switch serves as a root node, the first switch serves as a layer-n child node, and child nodes at other layers are at least one second switch;

The step that the first switch sends the first local bandwidth demand frames of the tenants to the second switch, and the second switch receives the first local bandwidth demand frames of the tenants sent by the first switch and aggregates the first local bandwidth demand frames of the tenants to obtain the global bandwidth demand frames of the tenants specifically includes the following steps:

the first switch sends the first local bandwidth demand frames of the tenants corresponding to each first switch to at least one second switch at a layer-(n−1) child node;

at least one second switch at the layer-(n−1) child node aggregates the first local bandwidth demand frames of the tenants to obtain second local bandwidth demand frames of the tenants corresponding to each second switch at the layer-(n−1) child node, and sends the second local bandwidth demand frames of the tenants to at least one second switch at a layer-(n−2) child node until the second switch at the root node receives the $(n-1)^{th}$ local bandwidth demand frames of the tenants corresponding to each second switch at the layer-2 child node; and the second switch at the root node aggregates the $(n-1)^{th}$ local bandwidth demand frames of the tenants to obtain the global bandwidth demand frames of the tenants.

The step that the second switch broadcasts the global bandwidth demand frames of the tenants to the first switch specifically includes the following steps:

the second switch at the root node broadcasts the global bandwidth demand frames of the tenants to at least one second switch at the layer-2 child node, and at least one second switch at the layer-2 child node broadcasts the global bandwidth demand frames of the tenants to at least one second switch at the layer-3 child node until at least one second switch at the layer-(n-1) child node receives the global bandwidth demand frames of the tenants and broadcasts the global bandwidth demand frames of the tenants to the first switch.

It needs to be indicated that each second switch has limited number of ports that can be connected to the first switch, in the case of a large number of first switches, the second switch needs to be scaled to realize that at least one second switch is connected to at least one first switch. The embodiment of the present invention realizes the scaling function of the second switch using a tree topology.

Wherein if the tree topology has n layers of nodes, the root node of the tree topology is a second switch, the layer-n child node of the tree topology is at least one first switch, and the child node of other layers of the tree topology is at least one second switch.

The structure and functions of the tree topology in the embodiment of the present invention will be explained below in combination with the following example.

Assuming that the tree topology has three layers, wherein the root node is a second switch, the layer-2 child nodes are three second switches, the layer-3 child nodes are eight first switches, and each second switch in the layer-2 child nodes is connected to at least one first switch.

The first switch receives the local bandwidth demand frames of the tenants sent by at least one gateway server, aggregates the local bandwidth demand frames of the tenants to obtain first local bandwidth demand frames of the tenants, and sends the first local bandwidth demand frames of the tenants to the 3 second switches at the layer-2 child nodes.

Each second switch at the layer-2 child node aggregates the received first local bandwidth demand frames of the tenants to obtain second local bandwidth demand frames of the tenants corresponding to each second switch at the layer-2 child node, and sends the second local bandwidth demand frames of the tenants to the second switch at the root node.

The second switch at the root node aggregates all the received local bandwidth demand frames of the tenants to obtain global bandwidth demand frames of the tenants, and broadcasts the global bandwidth demand frames of the tenants to each second switch at the layer-2 child node.

Each second switch at the layer-2 child node broadcasts the global bandwidth demand frames of the tenants to each first switch at the layer-3 child node.

At least one of the first switches receives and broadcasts the global bandwidth demand frames of the tenants to at least one gateway server corresponding to each first switch.

In the cloud data center tenant-level outbound rate limiting method provided by the embodiment of present invention, each first switch receives the local bandwidth demand frames of the tenants sent by at least one gateway server corresponding to the first switch, aggregates the local bandwidth demand frames of the tenants to obtain the first local bandwidth demand frames of the tenants, and sends the first local bandwidth demand frames of the tenants to the second switch at the layer (n--1) child node in the tree topology; the second switch at the layer (n-1) child node aggregates all the first local bandwidth demand frames of the tenants to obtain the second bandwidth demand frames of the tenants, and the second local bandwidth demand frames of the tenants are sent to the second switch at the layer (n-2) child node until the second switch at the layer root node receives and aggregates the $(n-1)^{th}$ local bandwidth demand frame to obtain the global bandwidth demand frames of the tenants, then broadcasts the global bandwidth demand frames of the tenants to the child nodes of each layer according to the tree topology, until the first switch receives and broadcasts the global bandwidth demand frames of the tenants to at least one gateway server, and then computes the bandwidth budgets of the tenants on each gateway server based on the global bandwidth demand frames of the tenants, so that the overheads of computing resources and bandwidth resources can be effectively reduced, the rate limiting accuracy can be improved, and the scalability is good.

Figure 4:
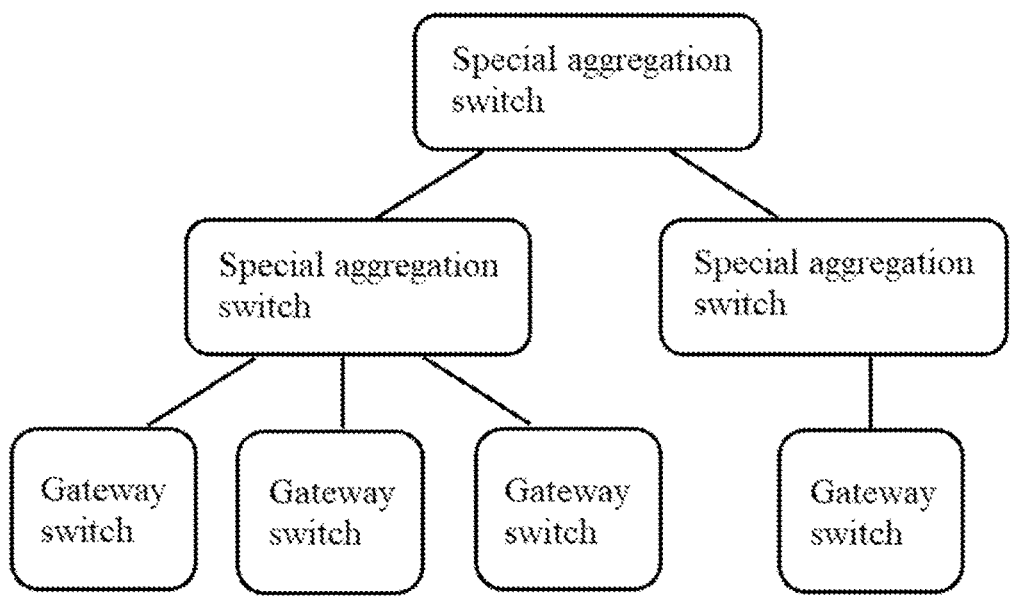
FIG. 4 is a second scene diagram of a cloud data center tenant-level outbound rate limiting method provided by the present invention.

The process of realizing the cloud data center tenant-level outbound rate limiting method based on a scalable tree topology is specifically explained in combination with FIG. 4. FIG. 4 is a second scene diagram of a cloud data center tenant-level outbound rate limiting method provided by an embodiment of the present invention.

As shown in FIG. 4, the tree topology is formed by 3 layers of nodes, wherein the root node is a special aggregation switch, the layer-2 child nodes are two special aggregation switches, the layer-3 child nodes are four gateway switches, one of the gateway switches is connected to the special aggregation switch at the right layer-2 child node, and the other three gateway switches are connected to the special aggregation switch at the left layer-2 child node.

Each gateway switch of layer 3 aggregates the local bandwidth demand frames of the tenants sent by at least one gateway server corresponding to the gateway switch to obtain first local bandwidth demand frames of the tenants, and sends the first local bandwidth demand frames of the tenants to each special aggregation switch at the layer-2 child nodes.

Each special aggregation switch at the layer-2 child node aggregates all the received first local bandwidth demand frames of the tenants to obtain second local bandwidth demand frames of the tenants, and sends the second local bandwidth demand frames of the tenants to the special aggregation switch at the root node.

The special aggregation switch at the root node aggregates all the received second local bandwidth demand frames of the tenants to obtain the global bandwidth demand frames of the tenants, and broadcasts the global bandwidth demand frames of the tenants to all the special aggregation switches at the layer-2 child nodes.

All the special aggregation switches at the layer-2 child nodes broadcast the global bandwidth demand frames of the tenants to all the gateway switches at the layer-3 child nodes, and each gateway switch broadcasts the global bandwidth demand frames of the tenants to at least one gateway server corresponding to the gateway switch.

On the basis of the contents of the above-mentioned embodiment, the switch includes at least two switches.

The step of receiving the local bandwidth demand frames of the tenants sent by all gateway servers, and aggregating the local bandwidth demand frames of the tenants sent by all the gateway servers to obtain the global bandwidth demand frames of the tenants specifically includes the following steps:

a $i^{th}$ switch receives the local bandwidth demand frames of the tenants sent by at least one gateway server corresponding to the $i^{th}$ switch, and receives the $(i-1)^{th}$ local bandwidth demand frames of the tenants sent by the $(i-1)^{th}$ switch;

the local bandwidth demand frames of the tenants and the $(i-1)^{th}$ local bandwidth demand frames of the tenants are aggregated to obtain the $i^{th}$ local bandwidth demand frames of the tenants;

if the $i^{th}$ local bandwidth demand frames of the tenants are the global bandwidth demand frames of the tenants, the global bandwidth demand frames of the tenants are sent to the first switch, and the first switch sends the global bandwidth demand frames of the tenants to the second switch until the global bandwidth demand frames of the tenants are received by all switches;

wherein i≥2 and i is an integer.

The step of broadcasting the global bandwidth demand frames of the tenants to all the gateway servers specifically includes the following step:

each switch broadcasts the global bandwidth demand frames of the tenants to at least one gateway server corresponding to each switch.

It needs to be indicated that considering the large scale of the cloud data center, the number of gateway servers that can be connected to a switch is too limited to handle the outbound packets of large-scale tenants. Therefore, the switch needs to be scaled. In the embodiment of the present invention, the scaling function of the switch is realized by an ring topolpgy.

Wherein the ring topolpgy is that the switches are in end-to-end connection, and each switch can be connected with at least one gateway server.

It needs to be indicated that in order to obtain the global bandwidth demand frames of the tenants, in the ring topolpgy, it is necessary to determine any one switch as a first switch serving as an initial switch, according to the transmission direction of the data pockets of the tenants, a next switch of the first switch is a second switch, a previous switch of the first switch is a last switch, and the global bandwidth demand frames of the tenants are generated by the last switch.

In an embodiment, a $i^{th}$ switch receives the local bandwidth demand frames of the tenants sent by at least one gateway server corresponding to the $i^{th}$ switch, receives the $(i-1)^{th}$ local bandwidth demand frames of the tenants sent by the $(i-1)^{th}$ switch, and aggregates the local bandwidth demand frames of the tenants and the $(i-1)^{th}$ local bandwidth demand frames of the tenants to obtain the $i^{th}$ local bandwidth demand frames of the tenants.

Further, if the $i^{th}$ local bandwidth demand frames of the tenants are the global bandwidth demand frames of the tenants, the $i^{th}$ switch is the last switch, the $i^{th}$ switch sends the global bandwidth demand frames of the tenants to the first switch, the first switch sends the global bandwidth demand frames of the tenants to the second switch until the global bandwidth demand frames of the tenants are received by all switches, and each switch sends the global bandwidth demand frames of the tenants to at least gateway server corresponding to the switch.

Or, if the $i^{th}$ local bandwidth demand frames of the tenants are not the global bandwidth demand frames of the tenants, the $i^{th}$ switch sends the $i^{th}$ local bandwidth demand frames of the tenants to the $(i+1)^{th}$ switch; the $(i+1)^{th}$ switch receives the $i^{th}$ local bandwidth demand frames of the tenants, receives the local bandwidth demand frames of the tenants sent by at least one gateway server corresponding to the $(i+1)^{th}$ switch, and aggregates the local bandwidth demand frames of the tenants and the $i^{th}$ local bandwidth demand frames of the tenants to obtain the $(i+1)^{th}$ local bandwidth demand frames of the tenants.

Wherein, the process of judging whether the $(i-1)^{th}$ local bandwidth demand frames of the tenants are the global bandwidth demand frames of the tenants is the same as the process of judging whether the $i^{th}$ local bandwidth demand frames of the tenants are the global bandwidth demand frames of the tenants.

In the cloud data center tenant-level outbound rate limiting method provided by the embodiment of present invention, according to the ring topolpgy, the $i^{th}$ switch receives the $(i-1)^{th}$ local bandwidth demand frames of the tenants sent by the $(i-1)^{th}$ switch and the local bandwidth demand frames of the tenants sent by at least one gateway server corresponding to the $i^{th}$ switch, respectively, and aggregates the local bandwidth demand frames of the tenants and the $(i-1)^{th}$ local bandwidth demand frames of the tenants to obtain the $i^{th}$ local bandwidth demand frames of the tenants; if the $i^{th}$ local bandwidth demand frames of the tenants are the global bandwidth demand frames of the tenants, the global bandwidth demand frames of the tenants are broadcast to all the switches according to the ring topolpgy; each switch broadcasts the global bandwidth demand frames of the tenants to at least one gateway server corresponding to the switch, and then computes the bandwidth budgets of the tenants on each gateway server based on the global bandwidth demand frames of the tenants, so that the overheads of computing resources and bandwidth resources can be effectively reduced, the rate limiting accuracy can be improved, and the scalability is good.

Figure 5:
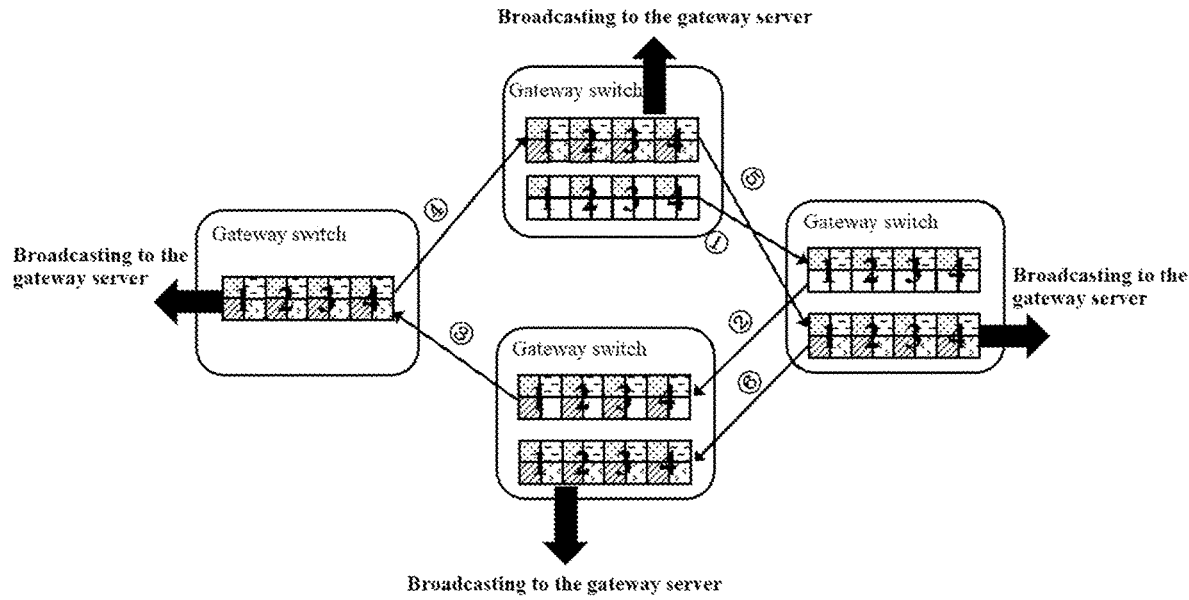
FIG. 5 is a third scene diagram of a cloud data center tenant-level outbound rate limiting method provided by the present invention.

The process of realizing the cloud data center tenant-level outbound rate limiting method based on a scalable ring topolpgy is specifically explained in combination with FIG. 5. FIG. 5 is a third scene diagram of a cloud data center tenant-level outbound rate limiting method provided by an embodiment of the present invention.

As shown in FIG. 5, the ring topolpgy is a closed-loop structure formed by four gateway switches in end-to-end connection. Any one of the gateway switches is taken as the first gateway switch, the first gateway switch serves as an initial gateway switch, and the fourth gateway switch is connected to the first gateway switch to generate the global bandwidth demand frames of the tenants.

The first gateway switch acquires the local bandwidth demand frames of the tenants sent by at least one gateway server corresponding to the first gateway switch, aggregates at least one local bandwidth demand frames of the tenants to obtain the first local bandwidth demand frames of the tenants, and sends the first local bandwidth demand frames of the tenants to the second gateway switch.

The second gateway switch receives the first local bandwidth demand frames of the tenants and receives the local bandwidth demand frames of the tenants sent by at least one gateway server corresponding to the second gateway switch, aggregates at least one local bandwidth demand frames of the tenants and the first local bandwidth demand frames of the tenants to obtain second local bandwidth demand frames of the tenants, and sends the second local bandwidth demand frames of the tenants to the third gateway switch.

The third gateway switch receives the second local bandwidth demand frames of the tenants and receives the local bandwidth demand frames of the tenants sent by at least one gateway server corresponding to the third gateway switch, aggregates at least one local bandwidth demand frames of the tenants and the second local bandwidth demand frames of the tenants to obtain third local bandwidth demand frames of the tenants, and sends the third local bandwidth demand frames of the tenants to the fourth gateway switch.

The fourth gateway switch receives the third local bandwidth demand frames of the tenants and receives the local bandwidth demand frames of the tenants sent by at least one gateway server corresponding to the fourth gateway switch, and aggregates at least one local bandwidth demand frames of the tenants and the third local bandwidth demand frames of the tenants to obtain global bandwidth demand frames of the tenants.

The fourth gateway switch sends the global bandwidth demand frames of the tenants to the first gateway switch, the first gateway switch sends the global bandwidth demand frames of the tenants to the second gateway switch, the second gateway switch sends the global bandwidth demand frames of the tenants to the third gateway switch, and each gateway switch broadcasts the global bandwidth demand frames of the tenants to at least one gateway server corresponding to each gateway switch.

Figure 6:
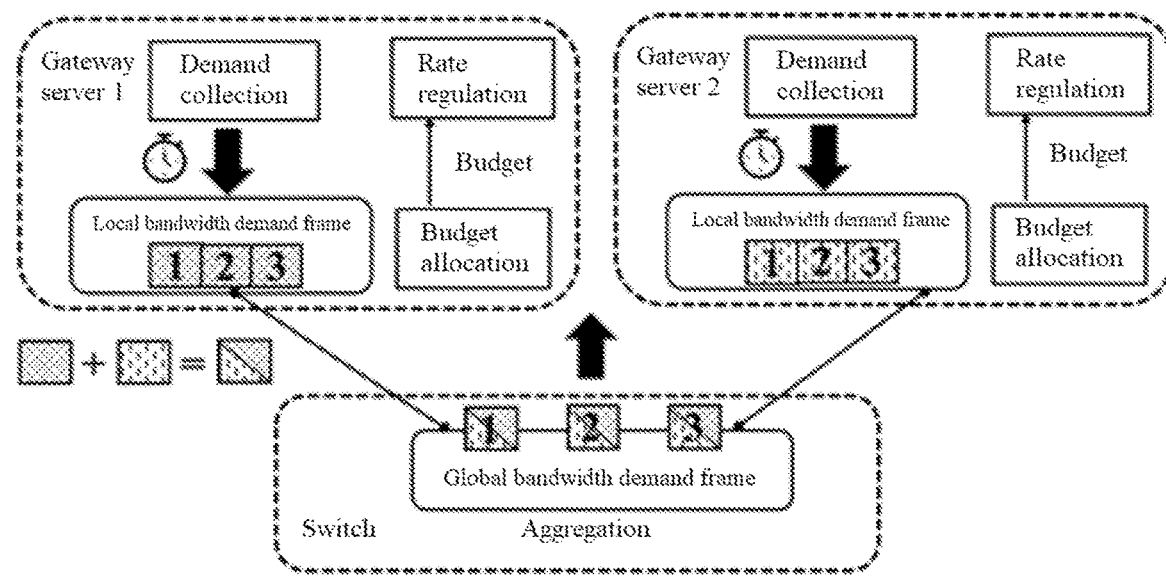
FIG. 6 is a fourth scene diagram of a cloud data center tenant-level outbound rate limiting method provided by the present invention.

The interaction process of the cloud data center tenant-level outbound rate limiting method is specifically explained in combination with FIG. 6. FIG. 6 is a fourth scene diagram of a cloud data center tenant-level outbound rate limiting method provided by an embodiment of the present invention.

As shown in FIG. 6, a switch is connected with two gateway servers, and the gateway servers include a gateway server 1 and a gateway server 2.

Wherein the gateway switches execute the three operations of demand collection, rate regulation and budget allocation. The switch executes the two operations of aggregation and broadcasting.

S1: the gateway switches start a timer to execute the operation of demand collection, specifically including the following steps: receiving and making statistics of outbound packets of tenants in a current period, obtaining local traffic rate information of the tenants, generating local bandwidth demand frames of the tenants based on the local traffic rate information of the tenants, and sending the local bandwidth demand frames of the tenants to the switch when the timing of the timer reaches the current period.

S2: the switch executes the operation of aggregation, specifically including the following steps: receiving the local bandwidth demand frames of the tenants sent by the two gateway servers, and aggregating the local bandwidth demand frames of the tenants sent by the two gateway servers to obtain global bandwidth demand frames of the tenants; and the switch executes the operation of broadcasting, specifically includes the following step: sending the global bandwidth demand frames of the tenants to all the gateway servers.

S3: the gateway switches execute the operation of budge allocation, specifically includes the following steps: receiving the global bandwidth demand frames of the tenants sent by the switch, and computing bandwidth budgets of the tenants based on the local traffic rate information of the tenants and the global bandwidth demand frames of the tenants.

S4: the gateway switches execute the operation of rate regulation, specifically includes the following steps: modifying the rate limiting parameters based on the bandwidth budgets of the tenants, and limiting the rate of the outbound packets of the tenants in a next period based on the rate limiting parameters.

Figure 7:
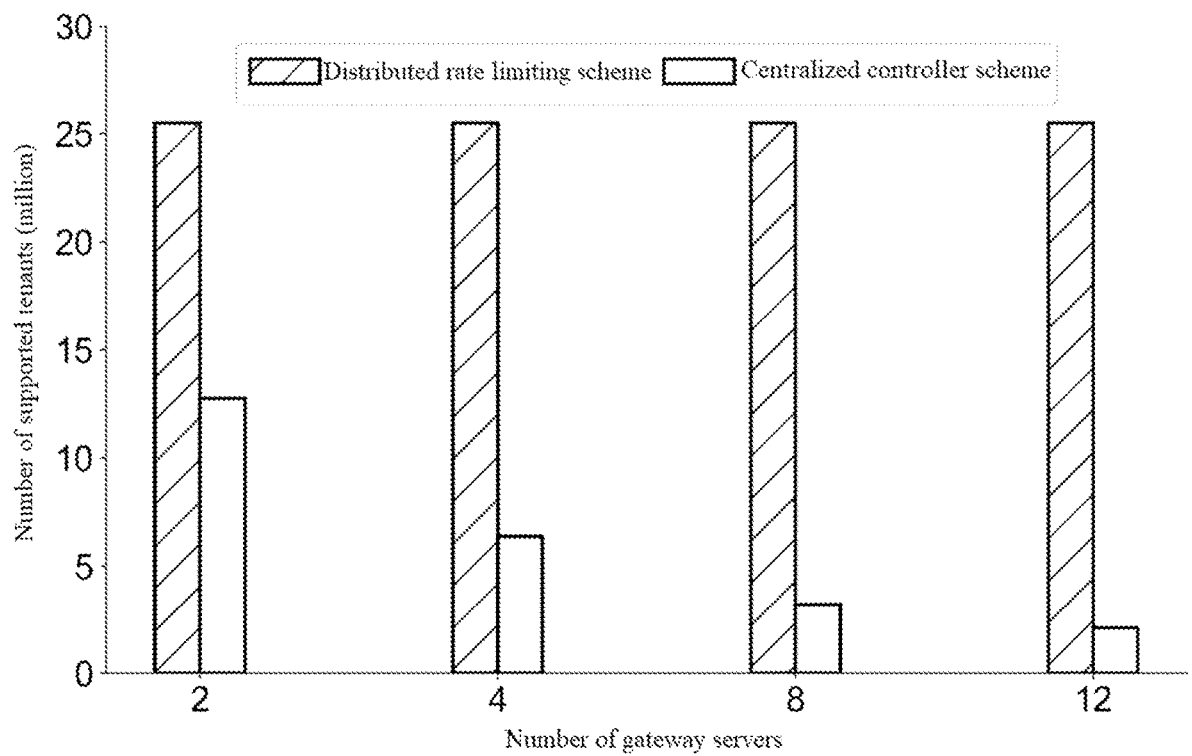
FIG. 7 is a contrast diagram of scalability between a cloud data center tenant-level outbound rate limiting method provided by the present invention and an existing technical solution.
Figure 8:
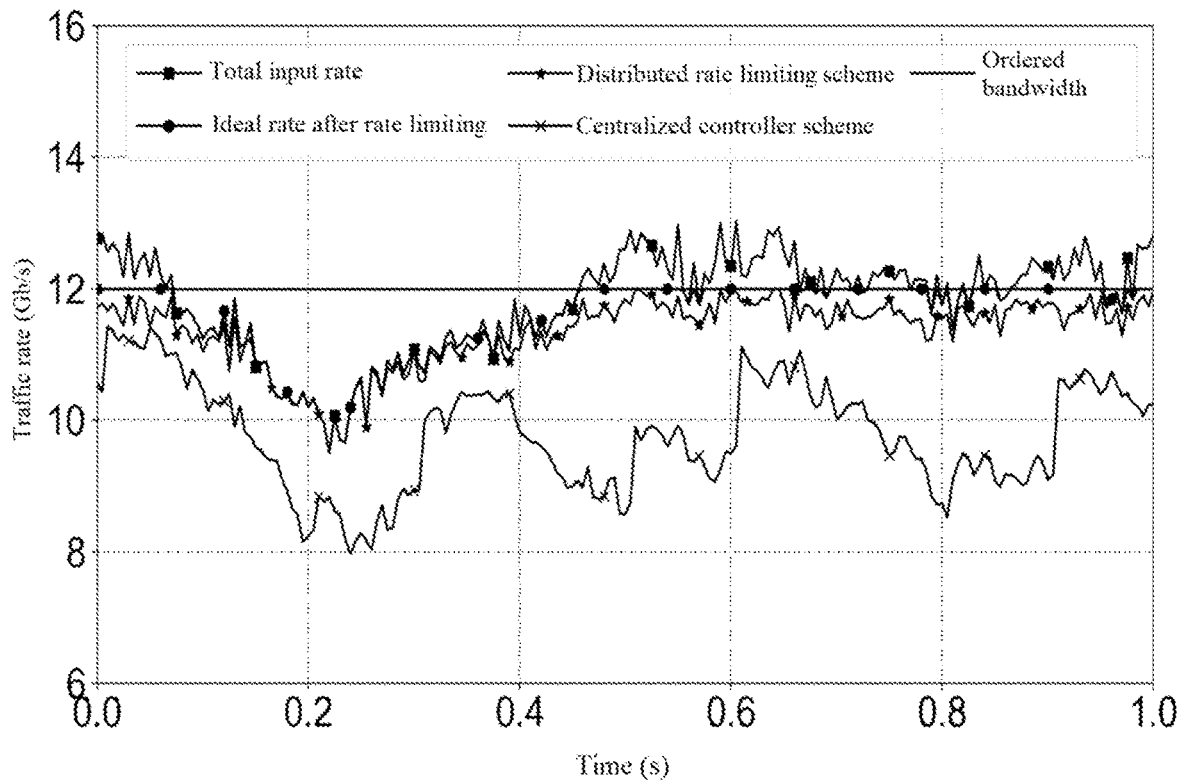
FIG. 8 is a contrast diagram of rate limiting accuracy between a cloud data center tenant-level outbound rate limiting method provided by the present invention and an existing technical solution.

The process of scalability comparison and rate limiting accuracy comparison between a cloud data center tenant-level outbound rate limiting method (distributed rate limiting scheme) and a centralized controller scheme in the prior art is specifically explained in combination with FIG. 7 and FIG. 8. FIG. 7 is a contrast diagram of scalability between a cloud data center tenant-level outbound rate limiting method provided by an embodiment of the present invention and an existing technical solution. FIG. 8 is a contrast diagram of rate limiting accuracy between a cloud data center tenant-level outbound rate limiting method provided by an embodiment of the present invention and an existing technical solution.

In the embodiment of the present invention, a gateway cluster is formed by twelve gateway servers and a programmable switch, and another server is connected with the programmable switch, wherein a link speed in the gateway cluster is 10 Gbps, and the link speed in the other server is 40 Gbps.

The server sends a plenty of outbound packets of the tenants to the programmable switch, and the programmable switch forwards the outbound packets of the tenants to the gateway servers.

As shown in FIG. 7, the scalability is compared between the cloud data center tenant-level outbound rate limiting method (distributed rate limiting scheme) and the centralized controller scheme in the prior art, and it can be concluded that as the number of gateway servers is increased, the number of tenants that can be supported by the cloud data center tenant-level outbound rate limiting method is unchanged, but the number of tenants that can be supported by the centralized controller scheme in the prior art is proportionally reduced. For example, in case of 12 gateway servers, the cloud data center tenant-level outbound rate limiting method (distributed rate limiting scheme) can support 2,500,000 tenants, and the centralized controller scheme in the prior art can only support about 200,000 tenants.

As shown in FIG. 8, the rate limiting accuracy is compared between the cloud data center tenant-level outbound rate limiting method (distributed rate limiting scheme) and the centralized controller scheme in the prior art, and it can be concluded that in case of the same number of tenants, the limiting rate of the centralized controller scheme in the prior art is less than the rate under an ideal rate limiting condition, with an average loss rate of traffic rate of 16.56%, and a maximum loss rate of traffic rate up to 30%; and the limiting rate of the cloud data center tenant-level outbound rate limiting method (distributed rate limiting scheme) is almost the same as the rate under an ideal rate limiting condition, with the average loss rate of traffic rate of 2.68%.

A gateway server provided by the present invention is described below, and the gateway server described below can be mutually referred to the cloud data center tenant-level outbound rate limiting method described above.

Figure 9:
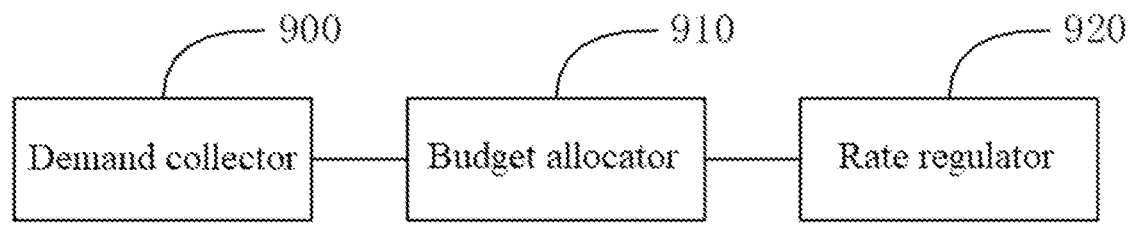
FIG. 9 is a structural diagram of a gateway server provided by the present invention.

FIG. 9 is a structural diagram of a gateway server provided by an embodiment of the present invention. As shown in FIG. 9, the gateway server includes a demand collector 900, a budget allocator 910 and a rate regulator 920, wherein the demand collector 900 is configured to start a timer, receive and make statistics of outbound packets of tenants in a current period, obtain local traffic rate information of the tenants based on all the outbound packets of the tenants in the current period, and generate local bandwidth demand frames of the tenants based on the local traffic rate information of the tenants; and configured to send the local bandwidth demand frames of the tenants to a switch when the timing of the timer reaches the current period;

the budget allocator 910 is configured to receive global bandwidth demand frames of the tenants sent by the switch, and compute bandwidth budgets of the tenants based on the local traffic rate information of the tenants and the global bandwidth demand frames of the tenants; and the rate regulator 920 is configured to modify rate limiting parameters based on the bandwidth budgets of the tenants, and limit the rate of the outbound packets of the tenants in a next period based on the rate limiting parameters.

For the gateway server provided by the embodiment of the present invention, the gateway server starts the timer, receives and makes statistics of outbound packets of tenants in a current period, obtains local traffic rate information of the tenants based on all the outbound packets of the tenants in the current period, generates local bandwidth demand frames of the tenants based on the local traffic rate information of the tenants, sends the local bandwidth demand frames of the tenants to a switch when the timing of the timer reaches the current period, receives global bandwidth demand frames of the tenants sent by the switch, computes bandwidth budgets of the tenants based on the local traffic rate information of the tenants and the global bandwidth demand frames of the tenants, modifies rate limiting parameters based on the bandwidth budgets of the tenants, and limits the rate of the outbound packets of the tenants in a next period based on the rate limiting parameters, so that the overheads of computing resources and bandwidth resources can be effectively reduced, and the rate limiting accuracy can be improved.

Optionally, the budget allocator 910 is also configured to:

obtain global traffic rate information of the tenants based on the global bandwidth demand frames of the tenants; and compute bandwidth budgets of the tenants based on the local traffic rate information of the tenants and the global traffic rate information of the tenants.

Optionally, the step of computing bandwidth budgets of the tenants based on the local traffic rate information of the tenants and the global traffic rate information of the tenants specifically includes the following step:

computing the bandwidth budgets allocated to the tenants by formula (1) based on the local traffic rate information of the tenants and the global bandwidth demand frames of the tenants:

$$R = \frac{D_{local}}{D_{global}} * R_0 \quad (1)$$

where R represents bandwidth budgets of the tenants, $R_0$ represents bandwidths ordered by the tenants, $D_{local}$ represents local traffic rate information of the tenants, and $D_{global}$ represents global traffic rate information of the tenants.

The gateway server provided by the present invention can realize the processes realized by the embodiments of method in FIG. 1, FIG. 6, FIG. 7 or FIG. 8, the same technical effects can be achieved, and it will not be repeated again in order to avoid repetition.

A switch provided by the present invention is described below, and the switch described below can be mutually referred to the cloud data center tenant-level outbound rate limiting method described above.

Figure 10:
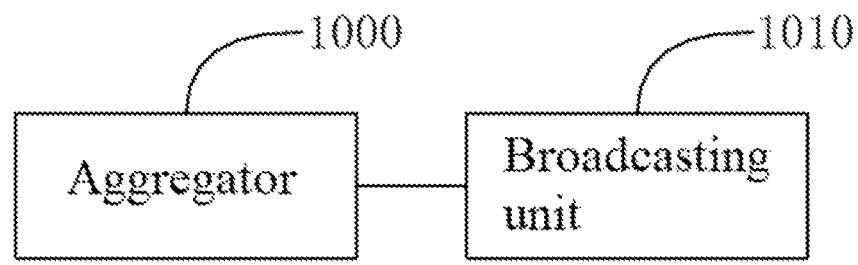
FIG. 10 is a structural diagram of a switch provided by the present invention.

FIG. 10 is a structural diagram of a switch provided by an embodiment of the present invention. As shown in FIG. 10, the switch includes an aggregator 1000 and a broadcasting unit 1010, wherein the aggregator 1000 is configured to receive local bandwidth demand frames of the tenants sent by all gateway servers, and aggregate the local bandwidth demand frames of the tenants sent by all the gateway servers to obtain global bandwidth demand frames of the tenants; and the broadcasting unit 1010 is configured to broadcast the global bandwidth demand frames of the tenants to all the gateway servers.

For the switch provided by the embodiment of present invention, the switch receives local bandwidth demand frames of the tenants sent by all gateway servers, aggregates the local bandwidth demand frames of the tenants sent by all the gateway servers to obtain global bandwidth demand frames of the tenants, and broadcasts the global bandwidth demand frames of the tenants to all the gateway servers, so that the overheads of computing resources and bandwidth resources can be effectively reduced, and the rate limiting accuracy can be improved.

Optionally, the broadcasting unit 1000 is also configured to:

acquire all local traffic rate information of the tenants based on the local bandwidth demand frames of the tenants sent by all the gateway servers, and sum up all the local traffic rate information of the tenants; and modify a local traffic rate information field in the received local bandwidth demand frames of the tenants sent by the last gateway server based on the summation result to obtain global bandwidth demand frames of the tenants.

Optionally, the switch includes a first switch and a second switch, and the first switch includes at least one switch.

The broadcasting unit 1000 is specifically used in the following case:

the first switch receives the local bandwidth demand frames of the tenants sent by at least one gateway server, aggregates the local bandwidth demand frames of the tenants to obtain first local bandwidth demand frames of the tenants, and sends the first local bandwidth demand frames of the tenants to the second switch; and the second switch receives the first local bandwidth demand frames of the tenants sent by the first switch, and aggregates the first local bandwidth demand frames of the tenants to obtain global bandwidth demand frames of the tenants.

The broadcasting unit 1010 is specifically used in the following case:

the global bandwidth demand frames of the tenants are broadcast to the first switch; and the first switch receives and broadcasts the global bandwidth demand frames of the tenants to at least one gateway server.

Optionally, the second switch includes at least one switch, wherein any second switch serves as a root node, the first switch serves as a layer-n child node, and child nodes at other layers are at least one second switch;

The step that the first switch sends the first local bandwidth demand frames of the tenants to the second switch, and the second switch receives the first local bandwidth demand frames of the tenants sent by the first switch and aggregates the first local bandwidth demand frames of the tenants to obtain global bandwidth demand frames of the tenants specifically includes the following steps:

the first switch sends the first local bandwidth demand frames of the tenants to at least one second switch at a layer-(n−1) child node;

at least one second switch at the layer-(n−1) child node aggregates the first local bandwidth demand frames of the tenants to obtain second local bandwidth demand frames of the tenants corresponding to each second switch at the layer-(n−1) child node, and sends the second local bandwidth demand frames of the tenants to at least one second switch at a layer-(n−2) child node until the second switch at the root node receives the (n−1)$^{th}$ local bandwidth demand frames of the tenants corresponding to each second switch at the layer-2 child node; and the second switch at the root node aggregates the (n−1)$^{th}$ local bandwidth demand frames of the tenants to obtain the global bandwidth demand frames of the tenants.

The step that the second switch broadcasts the global bandwidth demand frames of the tenants to the first switch specifically includes the following steps:

the second switch at the root node broadcasts the global bandwidth demand frames of the tenants to at least one second switch at the layer-2 child node, and at least one second switch at the layer-2 child node broadcasts the global bandwidth demand frames of the tenants to at least one second switch at the layer-3 child node until at least one second switch at the layer-(n−1) child node receives the global bandwidth demand frames of the tenants and broadcasts the global bandwidth demand frames of the tenants to the first switch.

Optionally, the switch includes at least two switches.

The broadcasting unit 1000 is specifically used in the following case:

a i$^{th}$ switch receives the local bandwidth demand frames of the tenants sent by at least one gateway server corresponding to the i$^{th}$ switch, and receives the (i−1)$^{th}$ local bandwidth demand frames of the tenants sent by the (i−1)$^{th}$ switch;

the local bandwidth demand frames of the tenants and the (i−1)$^{th}$ local bandwidth demand frames of the tenants are aggregated to obtain the i$^{th}$ local bandwidth demand frames of the tenants;

if the i$^{th}$ local bandwidth demand frames of the tenants are the global bandwidth demand frames of the tenants, the global bandwidth demand frames of the tenants are sent to the first switch, and the first switch sends the global bandwidth demand frames of the tenants to the second switch until the global bandwidth demand frames of the tenants are received by all switches;

wherein i≥2 and i is an integer.

The broadcasting unit 1010 is specifically used in the following case:

each switch broadcasts the global bandwidth demand frames of the tenants to at least one gateway server corresponding to each switch.

The switch provided by the present invention can realize the processes realized by the embodiments of methods in FIG. 2-FIG. 8, the same technical effects can be achieved, and it will not be repeated again in order to avoid repetition.

An embodiment of the present invention also provides a cloud data center tenant-level outbound rate limiting system, including the contents of gateway server as described in the above embodiment and the contents of switch as described in the above embodiment, which will not be repeated again.

Figure 11:
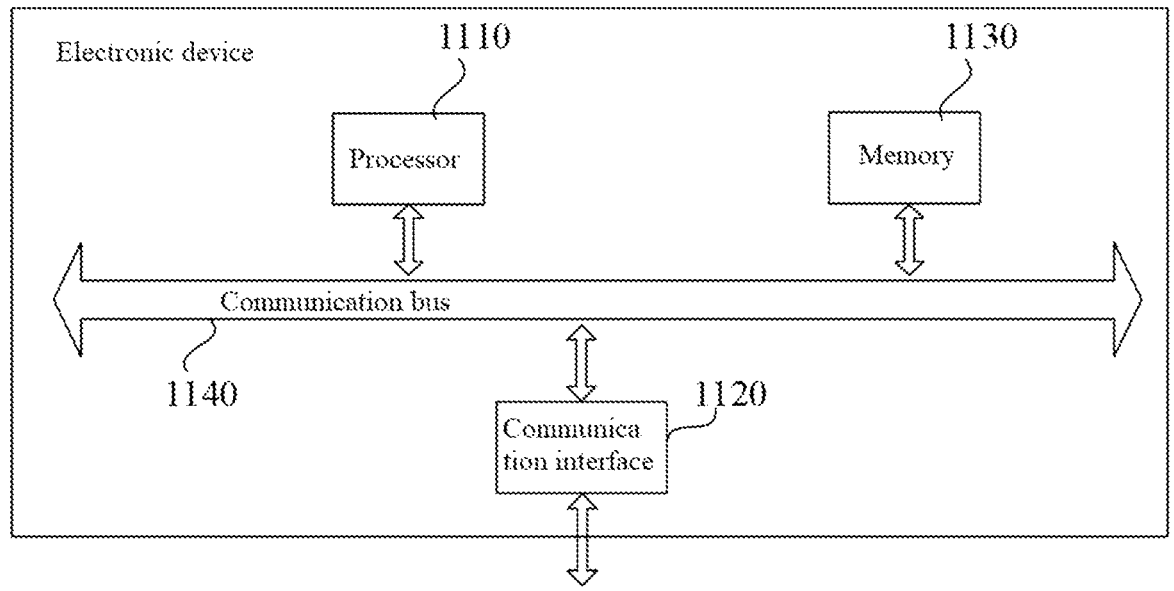
FIG. 11 is a structural diagram of an electronic device provided by the present invention.

FIG. 11 shows a diagram of the physical structure of an electronic device, as shown in FIG. 11, the electronic device can include a processor 1110, a communication interface 1120, a memory 1130 and a communication bus 1140, wherein the processor 1110, the communication interface 1120 and the memory 1130 complete communication with each other through the communication bus 1140. The processor 1110 can call a logic instruction in the memory 1130 to execute the cloud data center tenant-level outbound rate limiting method, and the method is applied to a gateway server, including the following steps:

starting a timer, receiving and making statistics of outbound packets of tenants in a current period, obtaining local traffic rate information of the tenants based on all the outbound packets of the tenants in the current period, and generating local bandwidth demand frames of the tenants based on the local traffic rate information of the tenants;

when the timing of the timer reaches the current period, sending the local bandwidth demand frames of the tenants to a switch;

receiving global bandwidth demand frames of the tenants sent by the switch, and computing bandwidth budgets of the tenants based on the local traffic rate information of the tenants and the global bandwidth demand frames of the tenants; and modifying rate limiting parameters based on the bandwidth budgets of the tenants, and limiting the rate of the outbound packets of the tenants in a next period based on the rate limiting parameters.

Or,

The processor 1110 can call a logic instruction in the memory 1130 to execute the cloud data center tenant-level outbound rate limiting method which is applied to a switch, and the method includes the following steps:

receiving local bandwidth demand frames of the tenants sent by all gateway servers, and aggregating the local bandwidth demand frames of the tenants sent by all the gateway servers to obtain global bandwidth demand frames of the tenants; and broadcasting the global bandwidth demand frames of the tenants to all the gateway servers.

In addition, the logic order in the above-mentioned memory 1130 can be realized in the form of a software functional unit, and when it is sold or used as an independent product, it can be stored in a computer-readable storage medium. Based on such understanding, the technical solution of the present invention in essence, or the part that contributes to the prior art or the part of the technical solution can be embodied in the form of a software product, and the computer software product is stored in a storage medium, including several instructions configured to enable a computer device (such as a personal computer, a server, or a network device, etc.) to execute all or part of the steps of the methods described in the embodiments of the present invention. The above-mentioned storage medium includes various media which can store procedure codes, such as U disk, mobile hard disk, read-only memory (ROM), random access memory (RAM), disk or CD-ROM.

In another aspect, the present invention also provides a computer program product, wherein the computer program product includes a computer program stored on a non-transitory computer-readable storage medium, the computer program includes program instructions, when the program instructions are executed by a computer, the computer can execute the cloud data center tenant-level outbound rate limiting method provided by the above-mentioned methods, the method is applied to a gateway server, and the method includes the following steps:

starting a timer, receiving and making statistics of outbound packets of tenants in a current period, obtaining local traffic rate information of the tenants based on all the outbound packets of the tenants in the current period, and generating local bandwidth demand frames of the tenants based on the local traffic rate information of the tenants;

when the timing of the timer reaches the current period, sending the local bandwidth demand frames of the tenants to a switch;

receiving global bandwidth demand frames of the tenants sent by the switch, and computing bandwidth budgets of the tenants based on the local traffic rate information of the tenants and the global bandwidth demand frames of the tenants; and modifying rate limiting parameters based on the bandwidth budgets of the tenants, and limiting the rate of the outbound packets of the tenants in a next period based on the rate limiting parameters.

Or, when the program instructions are executed by a computer, the computer can execute the cloud data center tenant-level outbound rate limiting method provided by the above-mentioned methods, and the method is applied to a switch, including the following steps:

receiving local bandwidth demand frames of the tenants sent by all gateway servers, and aggregating the local bandwidth demand frames of the tenants sent by all the gateway servers to obtain global bandwidth demand frames of the tenants; and broadcasting the global bandwidth demand frames of the tenants to all the gateway servers.

In another aspect, the present invention also provides a non-transitory computer-readable storage medium with a computer program stored, wherein the computer program can enabled when it is executed by the processor to execute the cloud data center tenant-level outbound rate limiting method provided by the above-mentioned embodiments, and the method is applied to a gateway server, including the following steps:

starting a timer, receiving and making statistics of outbound packets of the tenants in a current period, obtaining local traffic rate information of the tenants based on all the outbound packets of the tenants in the current period, and generating local bandwidth demand frames of the tenants based on the local traffic rate information of the tenants;

when the timing of the timer reaches the current period, sending the local bandwidth demand frames of the tenants to a switch;

receiving global bandwidth demand frames of the tenants sent by the switch, and computing bandwidth budgets of the tenants based on the local traffic rate information of the tenants and the global bandwidth demand frames of the tenants; and modifying rate limiting parameters based on the bandwidth budgets of the tenants, and limiting the rate of the outbound packets of the tenants in a next period based on the rate limiting parameters.

Or, the computer program is enabled when it is executed by the processor to execute the cloud data center tenant-level outbound rate limiting method provided by the above-mentioned methods, and the method is applied to a switch, including the following steps:

receiving local bandwidth demand frames of the tenants sent by all gateway servers, and aggregating the local bandwidth demand frames of the tenants sent by all the gateway servers to obtain global bandwidth demand frames of the tenants; and broadcasting the global bandwidth demand frames of the tenants to all the gateway servers.

The device embodiments described above are only examples, the described unit explained as a separate component can be either physically separated or not, the component displayed as a unit can be either a physical unit or not, that is, it can be either located in one place or distributed into a plurality of network elements. Part of or all the modules can be chosen according to the actual needs to achieve the objectives of the embodiments. It can be understood and implemented by those of ordinary skill in the art without making creative efforts.

Through the above descriptions of the embodiments, those skilled in the art can clearly know that the embodiments can be realized with the help of software and necessary general hardware platforms, and can certainly be realized through hardware as well. Based on such understanding, the above-mentioned technical solution in essence or the part that contributes to the prior art can be embodied in the form of a software product, and the computer software product can be stored in a storage medium, such as ROM/RAM, disk, optical disk, etc., including several instructions configured to enable a computer device (such as a personal computer, a server, or a network device, etc.) to execute various embodiments or the methods described in some parts of the embodiments.

Finally, it should be noted that the embodiments above are only used for explaining, rather than limiting, the technical solutions of the present invention; although the present invention is explained in detail referring to the above embodiments, those of ordinary skill in the art should be understood that the technical solutions recorded in the above embodiments can be modified, or a part of the technical features could be equivalently replaced; the modifications or replacements will not make the modified technical solutions depart from the spirit and scope of the technical solutions of the embodiments of the present invention.

The invention claimed is:

1. A cloud data center tenant-level outbound rate limiting method for a gateway server, comprising following steps:

starting a timer, receiving and generating statistics of outbound packets of tenants in a current period, obtaining local traffic rate information of the tenants based on all of the outbound packets of the tenants in the current period, and generating local bandwidth demand frames of the tenants based on the local traffic rate information of the tenants;

when a timing of the timer reaches the end of the current period, sending the local bandwidth demand frames of the tenants to a switch;

receiving global bandwidth demand frames of the tenants sent by the switch, and computing bandwidth budgets of the tenants based on the local traffic rate information of the tenants and the global bandwidth demand frames of the tenants; and modifying rate limiting parameters based on the bandwidth budgets of the tenants, and limiting a rate of the outbound packets of the tenants in a next period based on the rate limiting parameters.

2. The cloud data center tenant-level outbound rate limiting method of claim 1, wherein the step of computing the bandwidth budgets of the tenants based on the local traffic rate information of the tenants and the global bandwidth demand frames of the tenants further comprises:

obtaining global traffic rate information of the tenants based on the global bandwidth demand frames of the tenants; and computing the bandwidth budgets of the tenants based on the local traffic rate information of the tenants and the global traffic rate information of the tenants.

3. The cloud data center tenant-level outbound rate limiting method of claim 2, wherein the step of computing the bandwidth budgets of the tenants based on the local traffic rate information of the tenants and the global traffic rate information of the tenants further comprises:

computing the bandwidth budgets allocated to the tenants by formula (1) based on the local traffic rate information of the tenants and the global bandwidth demand frames of the tenants:

$$R = \frac{D_{local}}{D_{global}} * R_0 \qquad (1)$$

where R represents the bandwidth budgets of the tenants, $R_0$ represents bandwidths ordered by the tenants, $D_{local}$ represents the local traffic rate information of the tenants, and $D_{global}$ represents the global traffic rate information of the tenants.

4. An electronic device, comprising a memory, and a processor, wherein a computer program is stored in the memory and is operable on the processor, and the processor executes the program to realize steps of the cloud data center tenant-level outbound rate limiting method of claim 1.

5. A non-transitory computer-readable storage medium, with a computer program stored, wherein the computer program is executed by the processor to realize the steps of the cloud data center tenant-level outbound rate limiting method of claim 1.

6. A cloud data center tenant-level outbound rate limiting method for a switch, comprising following steps:
receiving local bandwidth demand frames of tenants sent by all gateway servers when a timer reaches end of a current period, and aggregating the local bandwidth demand frames of the tenants sent by all of the gateway servers to obtain global bandwidth demand frames of the tenants, wherein the local bandwidth demand frames are generated based on local traffic rate information of the tenants, the local traffic rate information of the tenants is obtained based on all of outbound packets of the tenants in the current period; and
broadcasting the global bandwidth demand frames of the tenants to all of the gateway servers, wherein bandwidth budgets of the tenants are computed based on the local traffic rate information of the tenants and the global bandwidth demand frames of the tenants, the bandwidth budgets of the tenants are configured to modify rate limiting parameters to limit a rate of the outbound packets of the tenants in a next period.

7. The cloud data center tenant-level outbound rate limiting method of claim 6, wherein the step of aggregating the local bandwidth demand frames of the tenants sent by all the gateway servers to obtain the global bandwidth demand frames of the tenants further comprises:
acquiring all of the local traffic rate information of the tenants based on the local bandwidth demand frames of the tenants sent by all of the gateway servers, and summing up all of the local traffic rate information of the tenants to obtain a summation result; and
modifying a local traffic rate information field in the received local bandwidth demand frames of the tenants sent by a last gateway server based on the summation result to obtain the global bandwidth demand frames of the tenants.

8. The cloud data center tenant-level outbound rate limiting method of claim 6, wherein the switch comprises at least one first switch and at least one second switch;
the step of receiving the local bandwidth demand frames of the tenants sent by all gateway servers, and aggregating the local bandwidth demand frames of the tenants sent by all of the gateway servers to obtain the global bandwidth demand frames of the tenants further comprises:
the at least one first switch receives the local bandwidth demand frames of the tenants sent by at least one gateway server, aggregates the local bandwidth demand frames of the tenants to obtain first local bandwidth demand frames of the tenants, and sends the first local bandwidth demand frames of the tenants to the at least one second switch;
the at least one second switch receives the first local bandwidth demand frames of the tenants sent by the at least one first switch, and aggregates the first local bandwidth demand frames of the tenants to obtain the global bandwidth demand frames of the tenants;
the step of broadcasting the global bandwidth demand frames of the tenants to all of the gateway servers further comprises:
the global bandwidth demand frames of the tenants are broadcast by the at least one second switch to the at least one first switch; and
the at least one first switch receives and broadcasts the global bandwidth demand frames of the tenants to at least one of the gateway servers.

9. The cloud data center tenant-level outbound rate limiting method of claim 8, wherein one of the at least one second switch serves as a root node, the at least one first switch serves as a layer-n child node, and the other of the at least one second switch serves as child nodes at other layers;
the step that the at least one first switch sends the first local bandwidth demand frames of the tenants to the at least one second switch, and the at least one second switch receives the first local bandwidth demand frames of the tenants sent by the at least one first switch, and aggregates the first local bandwidth demand frames of the tenants to obtain the global bandwidth demand frames of the tenants further comprises:
the at least one first switch sends the first local bandwidth demand frames of the tenants to the at least one second switch at a layer-(n−1) child node;
the at least one second switch at the layer-(n−1) child node aggregates the first local bandwidth demand frames of the tenants to obtain second local bandwidth demand frames of the tenants corresponding to each of the at least one second switch at the layer-(n−1) child node, and sends the second local bandwidth demand frames of the tenants to the at least one second switch at a layer-(n−2) child node until the at least one second switch at the root node receives $(n-1)^{th}$ local bandwidth demand frames of the tenants corresponding to each of the at least one second switch at a layer-2 child node;
the at least one second switch at the root node aggregates the $(n-1)^{th}$ local bandwidth demand frames of the tenants to obtain the global bandwidth demand frames of the tenants;
the step that the at least one second switch broadcasts the global bandwidth demand frames of the tenants to the at least one first switch further comprises:
the at least one second switch at the root node broadcasts the global bandwidth demand frames of the tenants to the at least one second switch at the layer-2 child node, and the at least one second switch at the layer-2 child node broadcasts the global bandwidth demand frames of the tenants to the at least one second switch at a layer-3 child node until the at least one second switch at the layer-(n−1) child node receives the global bandwidth demand frames of the tenants and broadcasts the global bandwidth demand frames of the tenants to the at least one first switch.

10. The cloud data center tenant-level outbound rate limiting method of claim 6, wherein the switch comprises at least two switches;

the step of receiving local bandwidth demand frames of the tenants sent by all gateway servers, and aggregating the local bandwidth demand frames of the tenants sent by all of the gateway servers to obtain the global bandwidth demand frames of the tenants further comprises:

a $i^{th}$ switch receives the local bandwidth demand frames of the tenants sent by at least one gateway server corresponding to the $i^{th}$ switch, and receives the $(i-1)^{th}$ local bandwidth demand frames of the tenants sent by the $(i-1)^{th}$ switch;

the local bandwidth demand frames of the tenants and the $(i-1)^{th}$ local bandwidth demand frames of the tenants are aggregated to obtain the $i^{th}$ local bandwidth demand frames of the tenants;

if the $i^{th}$ local bandwidth demand frames of the tenants are the global bandwidth demand frames of the tenants, the global bandwidth demand frames of the tenants are sent to the first switch, and the first switch sends the global bandwidth demand frames of the tenants to the second switch until the global bandwidth demand frames of the tenants are received by all of the at least two switches;

wherein and i≥2 is an integer;

the step of broadcasting the global bandwidth demand frames of the tenants to all of the gateway servers further comprises:

each of the at least two switch broadcasts the global bandwidth demand frames of the tenants to at least one gateway server corresponding to each of the at least two switch.

11. An electronic device, comprising a memory, a processor, wherein a computer program is stored in the memory and is operable on the processor, and the processor executes the program to realize steps of the cloud data center tenant-level outbound rate limiting method of claim 6.

12. A non-transitory computer-readable storage medium, with a computer program stored, wherein the computer program is executed by the processor to realize the steps of the cloud data center tenant-level outbound rate limiting method of claim 6.

* * * * *